(12) United States Patent
Iwane et al.

(10) Patent No.: US 11,366,433 B2
(45) Date of Patent: Jun. 21, 2022

(54) REINFORCEMENT LEARNING METHOD AND DEVICE

(71) Applicant: FUJITSU LIMITED, Kawasaki (JP)

(72) Inventors: Hidenao Iwane, Kawasaki (JP); Yoshihiro Okawa, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 676 days.

(21) Appl. No.: 16/293,724

(22) Filed: Mar. 6, 2019

(65) Prior Publication Data

US 2019/0302708 A1 Oct. 3, 2019

(30) Foreign Application Priority Data

Mar. 30, 2018 (JP) .............................. JP2018-070133

(51) Int. Cl.
*G05B 13/02* (2006.01)
*G06N 20/00* (2019.01)

(52) U.S. Cl.
CPC .......... *G05B 13/0265* (2013.01); *G06N 20/00* (2019.01)

(58) Field of Classification Search
CPC .......... G06N 3/08; G06N 20/00; B25J 9/163; G05B 13/0265; G05B 2219/32334; G05B 2219/33056; G05B 2219/34082; G05B 2219/40499
See application file for complete search history.

(56) References Cited

U.S. PATENT DOCUMENTS

| | | | | |
|---|---|---|---|---|
| 10,792,810 B1* | 10/2020 | Beckman | ................. | B25J 9/163 |
| 10,885,432 B1* | 1/2021 | Dulac-Arnold | ....... | G06N 3/0454 |
| 10,960,539 B1* | 3/2021 | Kalakrishnan | ......... | G06N 7/005 |
| 2010/0114807 A1* | 5/2010 | Ueda | ..................... | G06N 20/00 706/25 |
| 2014/0277718 A1* | 9/2014 | Izhikevich | ............... | B25J 9/161 700/250 |
| 2014/0277744 A1* | 9/2014 | Coenen | .................. | G06N 3/049 700/264 |
| 2017/0228662 A1* | 8/2017 | Gu | ........................ | G06N 3/0427 |
| 2018/0009445 A1* | 1/2018 | Nishi | ........................ | G06N 3/08 |
| 2018/0012137 A1* | 1/2018 | Wright | .................... | G05B 15/02 |
| 2018/0129974 A1* | 5/2018 | Giering | .................. | G06N 20/00 |

(Continued)

FOREIGN PATENT DOCUMENTS

| | | |
|---|---|---|
| JP | 2007-65929 | 3/2007 |
| JP | 2013-205890 | 10/2013 |
| JP | 2017-168029 | 9/2017 |

*Primary Examiner* — Ronald D Hartman, Jr.
(74) *Attorney, Agent, or Firm* — Fujitsu Patent Center

(57) ABSTRACT

A reinforcement learning device includes a processor that determines a first action on a control target by using a basic controller that defines an action on the control target depending on a state of the control target. The processor performs a first reinforcement learning within a first action range around the first action in order to acquire a first policy for determining an action on the control target depending on a state of the control target. The first action range is smaller than a limit action range for the control target. The processor determines a second action on the control target by using the first policy. The processor updates the first policy to a second policy by performing a second reinforcement learning within a second action range around the second action. The second action range is smaller than the limit action range.

6 Claims, 15 Drawing Sheets

(56) References Cited

U.S. PATENT DOCUMENTS

| | | | |
|---|---|---|---|
| 2018/0165603 A1* | 6/2018 | Van Seijen | G06N 3/084 |
| 2019/0004518 A1* | 1/2019 | Zhou | G05D 1/0088 |
| 2019/0156197 A1* | 5/2019 | Dasgupta | G06N 7/005 |
| 2019/0232488 A1* | 8/2019 | Levine | G06N 3/08 |
| 2019/0250568 A1* | 8/2019 | Li | G06N 3/08 |
| 2020/0276703 A1* | 9/2020 | Chebotar | G06N 3/0454 |

* cited by examiner

| TIME POINT | STATE | ACTION | REWARD |
|---|---|---|---|
| T | $s_T$ | $a_T$ | $r_T$ |
| T+1 | $s_{T+1}$ | $a_{T+1}$ | $r_{T+1}$ |
| T+2 | $s_{T+2}$ | $a_{T+2}$ | $r_{T+2}$ |
| ... | ... | ... | ... |

FIG. 8

| Q-TABLE | s0 | s1 | s2 | s3 |
|---|---|---|---|---|
| -1 | 2 | 3 | 2 | 4 |
| 0 | 3 | 2 | 3 | 4 |
| +1 | 5 | 1 | 1 | 3 |

800

⇧

| s0 | s1 | s2 | s3 |
|---|---|---|---|
| +1 | -1 | 0 | 0 |

| s0 | s1 | s2 | s3 |
|----|----|----|----|
| +1 | -1 | 0  | 0  |

$RL_1$ ← 900

+

| s0 | s1 | s2 | s3 |
|----|----|----|----|
| +1 | -1 | 0  | 1  |

$RL_2$ ← 910

=

| s0 | s1 | s2 | s3 |
|----|----|----|----|
| +2 | -2 | 0  | 1  |

$RL_1 + RL_2$ ← 920

REINFORCEMENT LEARNING METHOD AND DEVICE

CROSS-REFERENCE TO RELATED APPLICATION

This application is based upon and claims the benefit of priority of the prior Japanese Patent Application No. 2018-70133, filed on Mar. 30, 2018, the entire contents of which are incorporated herein by reference.

FIELD

The embodiment discussed herein is related to a reinforcement learning method and device.

BACKGROUND

In the field of reinforcement learning, an action on a control target is randomly changed to observe a reward in response to the action, and a policy for determining an optimal action is learned. The optimal action is an action (on the control target) that is determined to be optimal based on the result of observation. The reward is, for example, an incentive.

A certain related technique, for example, observes the state of the control target by using an observation apparatus, determines a temporal difference (TD) error based on the result of observation, and updates the policy by updating a TD error approximation apparatus. Another related technique performs reinforcement learning based, for example, on an input and an incentive or a penalty given to an output corresponding to the input, and generates a parametrically-expressed class set. Still another related technique predicts the location information regarding a survey target based, for example, on actual data on the location information regarding the survey target.

Related techniques are disclosed in, for example, Japanese Laid-open Patent Publication No. 2007-65929, Japanese Laid-open Patent Publication No. 2013-205890, and Japanese Laid-open Patent Publication No. 2017-168029.

The related techniques may perform an inappropriate action that adversely affects the control target due to a randomly changed action on the control target. For example, in a case where the control target is a server room and the action on the control target relates to an air conditioning temperature setting for the server room, the air conditioning temperature setting may heat the server room to a high temperature that causes a server in the server room to malfunction or become defective.

SUMMARY

According to an aspect of the present invention, provided is a reinforcement learning device including a memory and a processor coupled to the memory. The processor is configured to determine a first action on a control target by using a basic controller that defines an action on the control target depending on a state of the control target. The processor is configured to perform a first reinforcement learning within a first action range around the first action in order to acquire a first policy for determining an action on the control target depending on a state of the control target. The first action range is smaller than a limit action range for the control target. The processor is configured to determine a second action on the control target by using the first policy. The processor is configured to update the first policy to a second policy by performing a second reinforcement learning within a second action range around the second action. The second action range is smaller than the limit action range.

The object and advantages of the invention will be realized and attained by means of the elements and combinations particularly pointed out in the claims. It is to be understood that both the foregoing general description and the following detailed description are exemplary and explanatory and are not restrictive of the invention.

BRIEF DESCRIPTION OF DRAWINGS

FIG. 8 is a diagram (part 1) illustrating a merge process for integrating controllers;

FIG. 9 is a diagram (part 2) illustrating a merge process for integrating controllers;

DESCRIPTION OF EMBODIMENT

An embodiment will now be described in detail with reference to the accompanying drawings.

(Exemplary Reinforcement Learning Method According to Embodiment)

Figure 1:
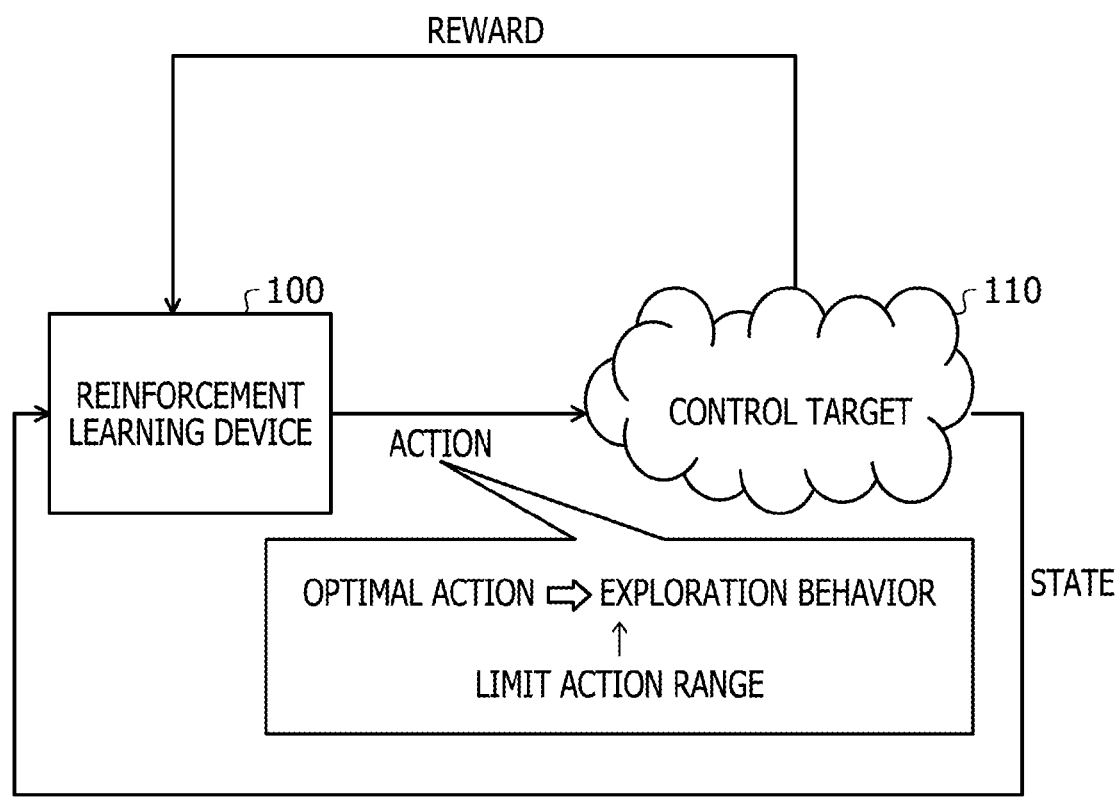
FIG. 1 is a diagram illustrating an exemplary reinforcement learning method according to an embodiment.

FIG. 1 is a diagram illustrating an exemplary reinforcement learning method according to the embodiment. A reinforcement learning device 100 is a computer that controls a control target 110 by determining an action on the control target 110 through reinforcement learning. The reinforcement learning device 100 is, for example, a server or a personal computer (PC).

The control target 110 is an event, for example, a real existing physical system. The control target 110 is, for example, an automobile, an autonomous mobile robot, a drone, a helicopter, a server room, a generator, a chemical plant, or a game. The action is an operation performed on the control target 110. The action is also referred to as an input. The action is a continuous quantity or a discrete quantity. The state of the control target 110 changes in response to the action performed on the control target 110. The state of the control target 110 is observable.

In reinforcement learning, for example, the action on the control target 110 is randomly changed, and a policy is acquired based on a reward in response to the action. In reinforcement learning, for example, the policy is acquired by performing the action a number of times for trial purposes. The reward is, for example, an incentive. The reward may be, for example, a value that is obtained by multiplying a cost by −1 to be handled in the same manner as the incentive. The cost is also referred to as a penalty. The policy is a control law for determining an optimal action that is considered to optimize a cumulative incentive (or cost) or an average incentive (or cost). The optimal action is an action estimated to be optimal under existing circumstances and need not be truly optimal.

An inappropriate action may be performed so as to adversely affect the control target 110 as a consequence of a random change in the action on the control target 110. For example, there may be a case where the control target 110 is a server room and the action on the control target 110 is an air conditioning temperature setting for the server room. In this case, the air conditioning temperature setting may be randomly changed so as to heat the server room to a high temperature that causes a server in the server room to malfunction or become defective. Meanwhile, the air conditioning temperature setting may be lowered to a low temperature that significantly increases power consumption.

There may be another case where, for example, the control target 110 is an unmanned aerial vehicle and the action on the control target 110 relates to a setting for a drive system of the unmanned aerial vehicle. In this case, the setting of the drive system may be randomly changed to a value that makes it difficult for the unmanned aerial vehicle to fly in a stable manner. This may cause the control target 110 to fall. There may be yet another case where, for example, the control target 110 is a windmill and the action on the control target 110 relates to a load torque of a generator coupled to the windmill. In this case, the load torque may be randomly changed to a value that significantly reduces the amount of power generation.

Consequently, it is preferred that reinforcement learning be performed to acquire the policy while avoiding an inappropriate action including an adverse effect on the control target 110. In view of the above circumstances, an embodiment of a reinforcement learning method will be described that makes it possible to perform reinforcement learning within an action range around an action determined by a basic controller, perform reinforcement learning again within an action range around an action determined by an acquired policy, and acquire a new policy. The reinforcement learning described below is a series of processes for acquiring a policy once by performing an action a number of times for trial purposes.

Referring to FIG. 1, a reinforcement learning device 100 sets, for a first policy, a basic controller that defines an action on a state of the control target 110. The basic controller is set, for example, by a user. The basic controller is a control law that determines an optimal action, which is an action considered to be optimal under existing circumstances. The reinforcement learning device 100 uses an action determined by the first policy in order to perform a first reinforcement learning within an action range smaller than a limit action range for the control target 110. The limit action range is set, for example, by the user. In the first reinforcement learning, the reinforcement learning device 100 acquires a more appropriate policy than the first policy for which the basic controller is set. The first reinforcement learning is, for example, a series of processes for acquiring a policy once by performing an action a number of times for trial purposes.

For example, the reinforcement learning device 100 determines an exploration behavior within an action range (which is smaller than the limit action range) around the optimal action determined by the first policy for which the basic controller is set, and observes a reward for the exploration behavior. Based on the result of observation, the reinforcement learning device 100 acquires a new policy defining an action on the control target 110 depending on the state of the control target 110 so that the reinforcement learning device 100 may determine a more appropriate optimal action than the first policy for which the basic controller is set.

The reinforcement learning device 100 performs a second reinforcement learning within an action range smaller than the limit action range by using an action determined by the policy acquired by the first reinforcement learning. In the second reinforcement learning, the reinforcement learning device 100 acquires a more appropriate policy than the last-acquired policy. The second reinforcement learning is, for example, a series of processes for acquiring a policy once by performing an action a number of times for trial purposes. Here, the last-acquired policy is a policy acquired by the first reinforcement learning.

For example, at predetermined time intervals, the reinforcement learning device 100 determines an exploration behavior within an action range (which is smaller than the limit action range) around the optimal action determined by the last-acquired policy, and observes a reward for the exploration behavior. The optimal action here is not an action considered to be optimal by a currently learned policy, but an action considered to be optimal by the last-acquired policy. Based on the result of observation, the reinforcement learning device 100 acquires a new policy defining an action on the control target 110 depending on the state of the control target 110 so that the reinforcement learning device 100 may determine a more appropriate optimal action than the last-acquired policy.

Consequently, the reinforcement learning device 100 may avoid performing, as an exploration behavior, an action immoderately deviating from an optimal action determined by the first policy or the already-acquired latest policy. This makes it possible to avoid an inappropriate action including an adverse effect on the control target 110. The reinforcement learning device 100 may acquire a more appropriate policy and perform an update while avoiding an inappropriate action. As a result, each time a policy is updated, the reinforcement learning device 100 may make an optimal action determined by a policy close to a local optimal action and control the control target 110 in an appropriate manner.

A case where the reinforcement learning device 100 performs the second reinforcement learning once has been described. However, the present embodiment is not limited to this case. For example, there may be another case where the reinforcement learning device 100 further repeats a process of performing a new second reinforcement learning within an action range smaller than the limit action range by using an action determined by a policy acquired by the last-performed second reinforcement learning.

Consequently, the reinforcement learning device 100 may repeatedly perform an update to a more appropriate policy while avoiding an inappropriate action. The reinforcement learning device 100 may acquire a more appropriate policy by performing an update, for example, from a previously acquired policy to the currently acquired policy. As a result, each time a policy is updated, the reinforcement learning device 100 may make an optimal action determined by a policy close to a local optimal action. As a consequence of the repeated update, the reinforcement learning device 100 may also acquire a policy for determining the local optimal action. The reinforcement learning device 100 may perform the local optimal action and control the control target 110 in an appropriate manner.

The following description deals with a case where the reward is a value obtained by multiplying the cost by −1 and the cost is minimized so as to acquire a policy for determining an optimal action that is considered to cause the reinforcement learning device 100 to increase the reward and thus reduce the cost.

(Exemplary Hardware Configuration of Reinforcement Learning Device 100)

Figure 2:
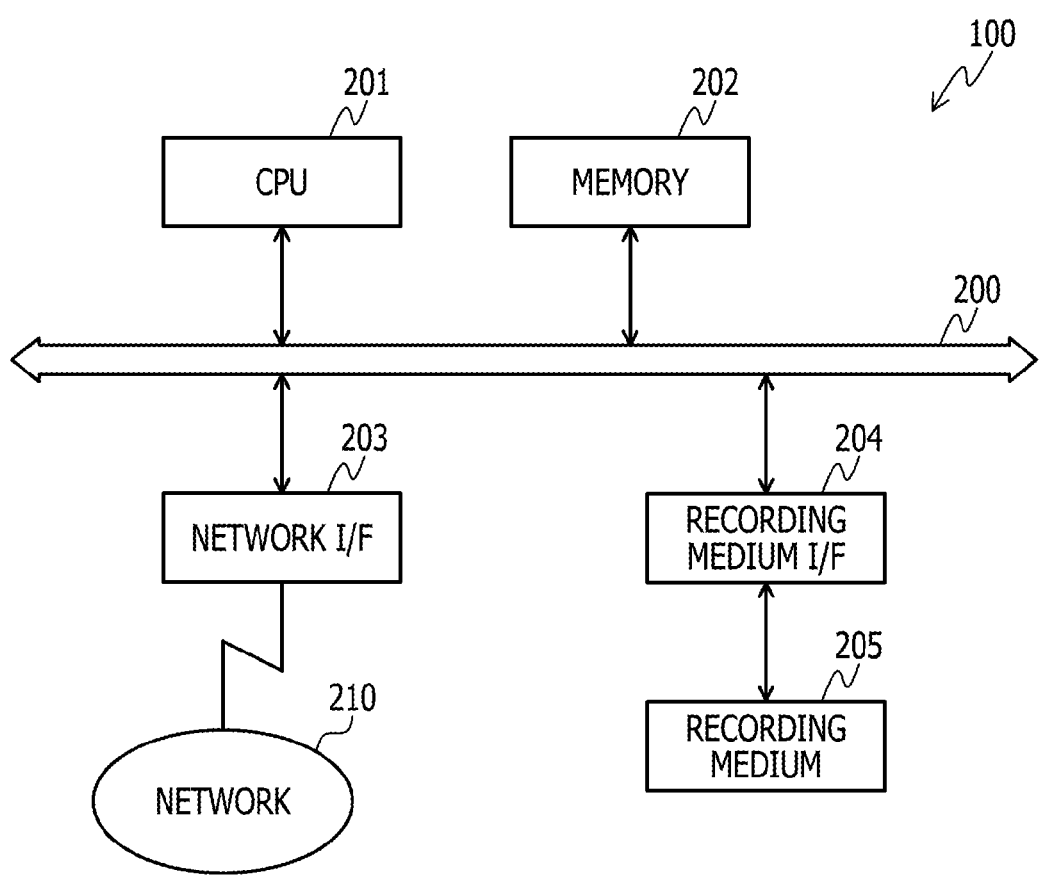
FIG. 2 is a block diagram illustrating an exemplary hardware configuration of a reinforcement learning device.

An exemplary hardware configuration of the reinforcement learning device 100 will now be descried with reference to FIG. 2.

FIG. 2 is a block diagram illustrating an exemplary hardware configuration of the reinforcement learning device 100. Referring to FIG. 2, the reinforcement learning device 100 includes a central processing unit (CPU) 201, a memory 202, a network interface (I/F) 203, a recording medium I/F 204, and a recording medium 205. All the above components are coupled through a bus 200.

The CPU 201 provides overall control of the reinforcement learning device 100. The memory 202 includes, for example, a read-only memory (ROM), a random access memory (RAM), and a flash ROM. For example, the flash ROM and the ROM store various programs, and the RAM is used as a work area for the CPU 201. When a program stored in the memory 202 is loaded into the CPU 201, the CPU 201 executes a coded process. The memory 202 may store various tables that will be described later with reference to FIGS. 3 and 4.

The network I/F 203 is coupled to a network 210 through a communication line. The network I/F 203 mediates communications between the network 210 and an internal interface, and controls a data input from and a data output to another computer. As the network I/F 203, for example, a modem or a local area network (LAN) adapter may be employed.

The recording medium I/F 204 controls a data read from and a data write to the recording medium 205 under the control of the CPU 201. The recording medium I/F 204 is, for example, a disk drive, a solid-state drive (SSD), or a universal serial bus (USB) port. The recording medium 205 is a nonvolatile memory for storing data written under the control of the recording medium I/F 204. The recording medium 205 is, for example, a disk, a semiconductor memory, or a USB memory. The recording medium 205 may be detachable from the reinforcement learning device 100. The recording medium 205 may store various tables that will be described later with reference to FIGS. 3 and 4.

The reinforcement learning device 100 may include, for example, a keyboard, a mouse, a display, a printer, a scanner, a microphone, and a speaker in addition to the aforementioned components. The reinforcement learning device 100 may include a plurality of units of the recording medium I/F 204 and of the recording medium 205. The reinforcement learning device 100 need not include the recording medium I/F 204 and the recording medium 205.

(Contents Stored in History Table 300)

Contents stored in a history table 300 will now be described with reference to FIG. 3. The history table 300 is implemented, for example, by a storage area of the memory 202 or recording medium 205 of the reinforcement learning device 100 depicted in FIG. 2.

Figure 3:
FIG. 3 is a diagram illustrating exemplary contents stored in a history table.

FIG. 3 is a diagram illustrating exemplary contents stored in the history table 300. As depicted in FIG. 3, the history table 300 includes a state field, an action field, and a reward field in association with a time point field. When information is set in each field at each time point, the history table 300 stores history information.

In the time point field, a time point is set at predetermined time intervals. In the state field, a state of the control target 110 at each time point is set. In the action field, an action on the control target 110 at each time point is set. In the reward field, a reward for an action on the control target 110 at each time point is set.

(Contents Stored in Action Value Table 400)

Contents stored in an action value table 400 will now be described with reference to FIG. 4. The following description of the action value table 400 assumes that a specific reinforcement learning method, such as a Q-learning method, is used as the reinforcement learning method. For example, the stored contents to be used vary with the employed reinforcement learning method. The action value table 400 is implemented, for example, by a storage area of the memory 202 or recording medium 205 of the reinforcement learning device 100 depicted in FIG. 2.

Figure 4:
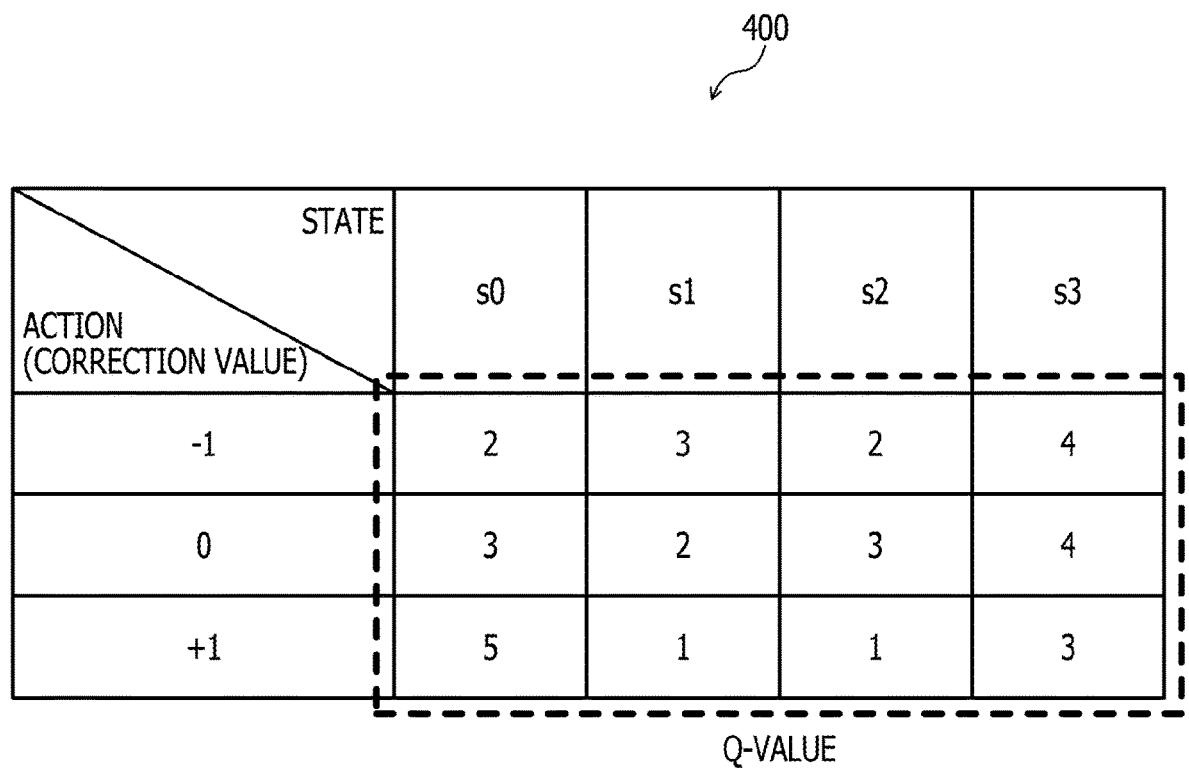
FIG. 4 is a diagram illustrating exemplary contents stored in an action value table.

FIG. 4 is a diagram illustrating exemplary contents stored in the action value table 400. As depicted in FIG. 4, the action value table 400 includes a state field, an action field, and a Q-value field. When, for example, the information in each field is updated each time a policy is acquired by reinforcement learning, the action value table 400 stores action value information as a record.

The state field is the uppermost row of the action value table 400. In the state field, a state of the control target 110 is set. The action field is the leftmost column of the action value table 400. In the action field, information indicative of an exploration behavior on the control target 110 is set. In the action field, a correction value for determining the exploration behavior is set as information indicative of the exploration behavior. The correction value indicates a degree of correction to be made on an optimal action that is determined by the first policy for which the basic controller is set or by the already-acquired latest policy. In the action field, for example, an exploration behavior itself may be set. In the example of FIG. 4, the correction value is set in the action field. In the Q-value field, a Q-value is set to indicate a degree of contribution to the reward when the exploration behavior indicated in the action field is performed in a state indicated in the state field.

(Exemplary Functional Configuration of Reinforcement Learning Device 100)

An exemplary functional configuration of the reinforcement learning device 100 will now be described with reference to FIG. 5.

Figure 5:
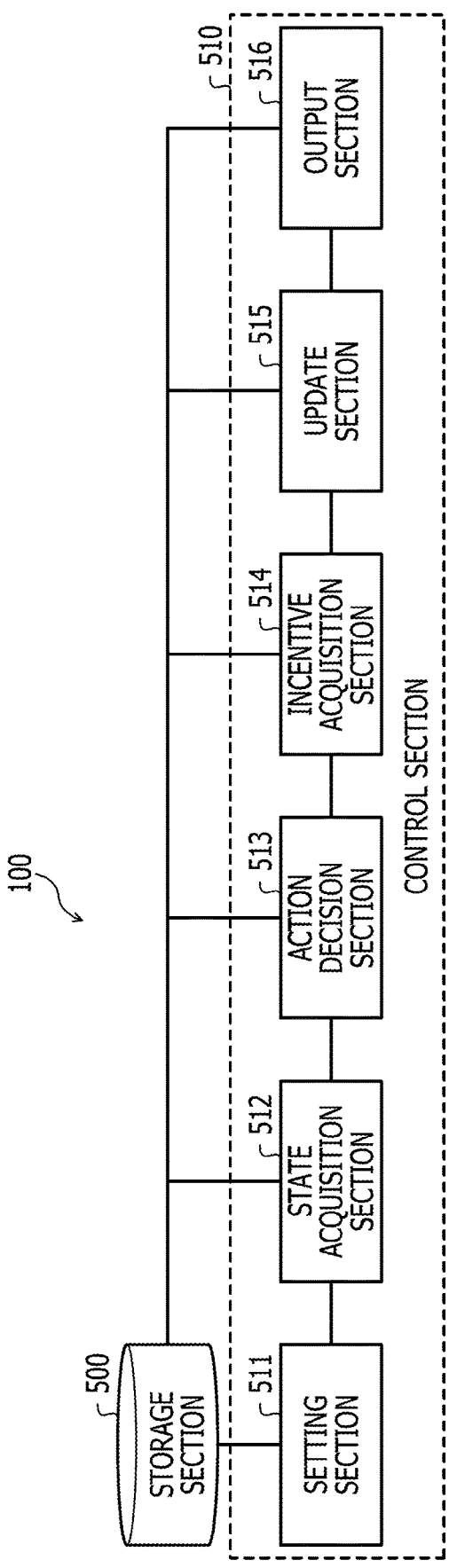
FIG. 5 is a block diagram illustrating an exemplary functional configuration of a reinforcement learning device.

FIG. 5 is a block diagram illustrating an exemplary functional configuration of the reinforcement learning device 100. The reinforcement learning device 100 includes a storage section 500, a setting section 511, a state acquisition section 512, an action decision section 513, an incentive acquisition section 514, an update section 515, and an output section 516. The setting section 511, the state acquisition section 512, the action decision section 513, the incentive acquisition section 514, the update section 515, and the output section 516 function as one example of a control section 510.

The storage section 500 is implemented, for example, by a storage area of the memory 202 or recording medium 205 depicted in FIG. 2. The following describes a case where the storage section 500 is included in the reinforcement learning device 100. However, the present embodiment is not limited to this case. For example, there may be another case where the storage section 500 is included in a device other than the reinforcement learning device 100 and the contents stored in the storage section 500 are referenceable from the reinforcement learning device 100.

The functions of the setting section 511, state acquisition section 512, action decision section 513, incentive acquisition section 514, update section 515, and output section 516 are implemented, for example, by the network I/F 203 or by allowing the CPU 201 to execute a program stored in the storage area of the memory 202 or recording medium 205 depicted in FIG. 2. The result of processing by each functional section is stored, for example, in a storage area of the memory 202 or recording medium 205 depicted in FIG. 2.

The storage section 500 stores various pieces of information that is referenced or updated during processing by each functional section. The storage section 500 accumulates the action on the control target 110, the state of the control target 110, and the reward from the control target 110. It is preferred that the action be an ordinal scale and not a nominal scale. The ordinal scale indicates that the magnitude of a value indicative of an action has a meaning. Meanwhile, the nominal scale relates to a case where, for example, a number assigned to an action by the user for convenience sake is used as a value indicative of the action. The storage section 500 uses the history table 300 depicted in FIG. 3 to store, for example, the action on the control target 110, the state of the control target 110, and the reward from the control target 110 at each time point. Consequently, the storage section 500 may allow each processing section to reference the action on the control target 110, the state of the control target 110, and the reward from the control target 110.

The storage section 500 stores an action value of each of some actions in each state of the control target 110. The action value is determined based, for example, on the reward. The action value is, for example, a Q-value that indicates the degree of contribution to the reward when an action on the control target 110 is performed. The storage section 500 stores the action value table 400 depicted, for example, in FIG. 4. Consequently, the storage section 500 may allow each processing section to reference the action value.

The storage section 500 may store a value function for calculating the Q-value. The value function is expressed, for example, by a polynomial. The polynomial is expressed by using a variable indicative of a state and an action. The storage section 500 stores, for example, a polynomial expressive of the value function and coefficients of the polynomial. Consequently, the storage section 500 may allow each processing section to reference the value function.

The following description initially deals with the control section 510, and subsequently deals with the setting section 511, state acquisition section 512, action decision section 513, incentive acquisition section 514, update section 515, and output section 516, which function as one example of the control section 510.

The control section 510 sets, for the first policy, a basic controller that defines an action on the control target 110 depending on a state of the control target 110. The policy is a control law for determining an optimal action that is considered to optimize a cumulative incentive (or cost) or an average incentive (or cost).

The control section 510 performs the first reinforcement learning within an action range smaller than the limit action range for the control target 110 by using an action determined by the first policy for which the basic controller is set. The basic controller is set, for example, by the user. The basic controller is a control law for determining an optimal action. The limit action range is set, for example, by the user. In the first reinforcement learning, the control section 510 acquires a policy that may determine a more appropriate optimal action than the first policy for which the basic controller is set. The first reinforcement learning is, for example, is a series of processes that is performed until a policy is acquired once based on an incentive acquired by performing an action a number of times for trial purposes. The acquired policy is, for example, a control law including the basic controller and an additional controller. The additional controller defines the amount of correction within an action range (which is smaller than the limit action range) around an action determined by the first policy for which the basic controller is set.

For example, at predetermined time intervals, the control section 510 determines an exploration behavior having, as an action, an amount of correction within an action range (which is smaller than the limit action range) around the optimal action determined by the first policy for which the basic controller is set, and observes a reward for the exploration behavior. The exploration behavior is an action performed to explore for a more appropriate action. The exploration behavior is, for example, an action defined by correcting the optimal action. Based on the result of observation, the control section 510 acquires a new policy, which defines an action on the control target 110 depending on the state of the control target 110 so that the control section 510 may determine a more appropriate optimal action than the first policy for which the basic controller is set.

Consequently, in order to perform an action that is not significantly different from the first policy for which the basic controller is set, the control section 510 may acquire a more appropriate policy than the first policy, for which the basic controller is set, while avoiding an inappropriate action. As a result, the control section 510 may make the optimal action determined by the acquired policy close to an optimal action that is actually locally optimal, and control the control target 110 in an appropriate manner.

In the first reinforcement learning, the control section 510 may, in some cases, acquire a policy including the basic controller and the additional controller. The additional controller defines the amount of correction within an action range (which is smaller than limit action range) around an action determined by the first policy for which the basic controller is set. In the first reinforcement learning, alternatively, the control section 510 may acquire a new policy without using the basic controller. For example, in the first reinforcement learning, the control section 510 may acquire a new policy based on the action value table 400 for storing an exploration behavior itself that is defined by correcting the optimal action according to the first policy.

For example, at predetermined time intervals, the control section 510 determines the amount of correction within an action range smaller than the limit action range with respect to the optimal action determined by the first policy for which the basic controller is set, and observes a reward for the amount of correction. Based on the result of observation, the control section 510 learns an additional controller defining the amount of correction for determining an optimal action that is more appropriate than the optimal action determined by the first policy for which the basic controller is set. The control section 510 acquires a new policy including the basic controller and the additional controller.

For example, the control section 510 performs the first reinforcement learning, which will be described later with reference to FIGS. 7A to 7C. As described later with reference to FIGS. 7A to 7C, the control section 510 determines the exploration behavior a number of times within an action range in the vicinity of an action determined by the first policy for which a basic controller $C_0$ is set. The term "vicinity" indicates an action range smaller than the limit action range. Next, as a consequence of the determination of the exploration behavior that is made a number of times, the control section 510 generates an additional controller $RL_1$. The control section 510 then acquires a policy $C_0+RL_1$ by combining the basic controller $C_0$ with the additional controller $RL_1$.

Consequently, the control section 510 may acquire a policy that may determine a more appropriate optimal action than the basic controller. As a result, the control section 510 may make the optimal action determined by the acquired policy close to an optimal action that is actually locally optimal, and control the control target 110 in an appropriate manner.

The control section 510 performs the second reinforcement learning within an action range smaller than the limit action range by using the action determined by the policy acquired by the first reinforcement learning. In the second reinforcement learning, the control section 510 acquires a policy that may determine a more appropriate optimal action than the last-acquired policy. The last-acquired policy is, for example, a policy acquired by the first reinforcement learning.

The control section 510, for example, determines the exploration behavior within an action range (which is smaller than the limit action range) around the optimal action determined by the last-acquired policy, and observes a reward for the exploration behavior, at regular time intervals. Based on the result of observation, the control section 510 acquires a new policy, which defines an action on the control target 110 depending on the state of the control target 110, so that the control section 510 may determine a more appropriate optimal action than the action acquired by the last-acquired policy.

Consequently, the control section 510 may perform a policy update so that the control section 510 may determine a more appropriate optimal action than the policy acquired by the first reinforcement learning. As a result, the control section 510 may make the optimal action determined by the acquired policy close to an optimal action that is actually locally optimal, and control the control target 110 in an appropriate manner.

In the second reinforcement learning, the control section 510 may acquire, for example, a policy including the last-acquired policy and an additional controller that defines the amount of correction within an action range (which is smaller than the limit action range) around the action determined by the last-acquired policy. The last-acquired policy is, for example, a policy including the basic controller and one or more additional controllers defining the amount of correction. The last-acquired policy is different from a currently learned policy. Alternatively, the second reinforcement learning may acquire a new policy without using the basic controller and the additional controllers. For example, the second reinforcement learning may acquire a new policy based on the action value table 400 for storing an exploration behavior itself that is defined by correcting an optimal action according to the already-acquired policy.

For example, at predetermined time intervals, the control section 510 determines the amount of correction within an action range smaller than the limit action range with respect to the optimal action determined by the last-acquired policy, and observes a reward for the amount of correction. Based on the result of observation, the control section 510 learns an additional controller defining the amount of correction for making the optimal action determined by the last-acquired policy more appropriate. The control section 510 acquires a new policy including the last-acquired policy and the additional controller.

The control section 510, for example, performs the second and subsequent reinforcement learnings that will be described later with reference to FIGS. 7A to 7C. As described later with reference to FIGS. 7A to 7C, the control section 510 determines the exploration behavior a number of times within an action range in the vicinity of an optimal action determined by the last-acquired policy $C_0+RL_1$. Next, as a consequence of the determination of the exploration behavior that is made a number of times, the control section 510 generates an additional controller $RL_2$. The control section 510 then acquires a new policy $C_0+RL_1+RL_2$ by combining the last-acquired policy $C_0+RL_1$ with the additional controller $RL_2$.

Consequently, the control section 510 may perform a policy update so that the control section 510 may determine a more appropriate optimal action than the policy acquired by the first reinforcement learning. As a result, the control section 510 may make the optimal action determined by the acquired policy close to an optimal action that is actually locally optimal, and control the control target 110 in an appropriate manner. In a case where a correction value is to be stored in the action value table 400, the control section 510 may reduce the size of a storage area for storing the action value table 400 as compared with a case where the exploration behavior itself is to be stored in the action value table 400.

The second reinforcement learning may acquire, for example, a policy that is obtained by integrating an additional controller included in the last-acquired policy with an additional controller defining the amount of correction within an action range (which is smaller than the limit action range) around an action determined by the last-acquired policy.

For example, at predetermined time intervals, the control section 510 determines the amount of correction within an action range smaller than the limit action range with respect to the optimal action determined by the last-acquired policy, and observes a reward for the amount of correction. Based on the result of observation, the control section 510 learns a new additional controller defining the amount of correction for making the optimal action determined by the last-acquired policy more appropriate. The control section 510 generates an integrated additional controller that is obtained by integrating the additional controller included in the last-acquired policy with the new additional controller. The control section 510 acquires a new policy including the integrated additional controller and the basic controller included in the last-acquired policy.

Consequently, the control section 510 may perform a policy update by acquiring a policy that is more appropriate than the policy acquired by the first reinforcement learning while avoiding an inappropriate action. As a result, the control section 510 may make the optimal action determined by the acquired policy close to an optimal action that is actually locally optimal, and control the control target 110 in an appropriate manner. The control section 510 may also decrease the number of additional controllers included in the acquired policy and reduce the amount of processing in a case where an action is determined by the acquired policy.

The control section 510 may repeat a process of performing a new second reinforcement learning within an action range smaller than the limit action range by using an action determined by a policy acquired by the last-performed second reinforcement learning.

Consequently, while avoiding an inappropriate action, the reinforcement learning device 100 may repeatedly perform a policy update so that the reinforcement learning device 100 may determine a more appropriate optimal action than the policy acquired by the last-performed second reinforcement learning. As a result, each time a policy is updated, the reinforcement learning device 100 may make an optimal action determined by the policy close to an optimal action that is actually locally optimal, and control the control target 110 in an appropriate manner.

The following description deals with the setting section 511, state acquisition section 512, action decision section 513, incentive acquisition section 514, update section 515, and output section 516, which function as one example of the control section 510 to implement the first reinforcement learning and the second reinforcement learning.

The setting section 511 initializes, for example, variables used in various processing sections. For example, the setting section 511 sets T to 0, j to 1, and C to $C_0$. T is a symbol indicative of time. j is a symbol indicative of what number the reinforcement learning is (for example, first, second). C is a symbol indicative of an already-acquired policy and is a function for generating an m-dimensional action from an n-dimensional state s. $C_0$ is the basic controller. $C_0$ is a function $C_0(s)$ that outputs an m-dimensional action a when an n-dimensional state is inputted. For example, $C_0(s)$ is a proportional-integral (PI) controller or a fixed controller that outputs a predefined action.

$\pi_j$ is a j-th additional controller. Based on an $n_j$-dimensional feature amount $\phi_j(s)$ obtained from the n-dimensional state s, the additional controller determines the amount of correction from an optimal action determined by the already-acquired latest policy in order to determine the exploration behavior based on the optimal action. As the reinforcement learning method, for example, the Q-learning method or the state-action-reward-state-action (SARSA) method may be used. As the additional controller, for example, the action-value function or the action-value table may be used. The additional controller may determine an exploration behavior based on the optimal action determined by the already-acquired latest policy based on the $n_j$-dimensional feature amount $\phi_j(s)$ obtained from the n-dimensional state s, and allow the control section 510 to acquire a new policy based on the exploration behavior. $A_j$ is an action range and is an action space explored by the additional controller $\pi_j$. $\phi_j(s)$ is a symbol indicative of a function for converting an n-dimensional state to an $n_j$-dimensional feature amount. $\phi_j$ is used in a case where, for example, a Q-value calculation formula is a calculation formula for calculating the Q-value based on the $n_j$-dimensional feature amount. $\phi_j$ is a function used for a j-th reinforcement learning. Consequently, the setting section 511 may allow the various processing sections to use the variables.

The state acquisition section 512 obtains the state of the control target 110. The state acquisition section 512 stores the obtained state s in the storage section 500. The state acquisition section 512, for example, observes the state of the control target 110 at predetermined time intervals and stores the observed state in the storage section 500 in association with the time point of observation. The state acquisition section 512 stores the state s in the history table 300. Consequently, the state acquisition section 512 may allow the action decision section 513 and the update section 515 to reference the state.

The action decision section 513 determines the exploration behavior. The action decision section 513 stores the exploration behavior in the storage section 500. The exploration behavior is an action of exploring for a more appropriate action. For example, the ε-greedy algorithm is used. The ε-greedy algorithm performs a random action with a probability of ε, and performs an optimal action with a probability of 1-ε. This optimal action is, for example, an optimal action determined by a currently learned action value table 400.

The action decision section 513 substitutes, for example, an obtained n-dimensional state s into an acquired policy C, and determines the optimal action C(s) in accordance with the acquired policy C. Next, the action decision section 513 uses an additional controller $\pi_j$ to determine $b_T$, which is an action. The action decision section 513 determines the amount of correction $\varphi_j(b_T)$ for correcting the determined optimal action C(s) within an action range $A_j$, and determines an exploration behavior $a_T$=optimal action C(s)+ correction amount $\varphi_j(b_T)$. Action conversion $\varphi_j$ is a function that makes it possible to perform conversion to an m-dimensional correction amount and perform computation with the optimal action C(s) in a case where, for example, the dimension of an action is m and $b_T$ is less than the m-dimension. $\varphi_j$ is used, for example, to determine the exploration behavior $a_T$ by correcting fewer than m variables in a case where there are m variables indicative of an action. For example, $\varphi_j$ sets a correction amount other than those for fewer than m variables to 0. In the j-th reinforcement learning, $\varphi_j$ suppresses an increase in the processing amount as compared with the case of correcting m variables. The action decision section 513 stores the determined exploration behavior in the history table 300. Consequently, the action decision section 513 may determine a desirable action on the control target 110 and controlling the control target 110 in an efficient manner.

The incentive acquisition section 514 obtains a reward for an action. The reward is, for example, an incentive. The reward may be a value obtained by multiplying the cost by −1. The incentive acquisition section 514 stores the reward in the storage section 500. For example, each time an action on the control target 110 is performed, the incentive acquisition section 514 obtains a reward $r_T$ for the control target 110 after a predetermined time following the action, and stores the obtained reward $r_T$ in the history table 300. $r_T$ is a scalar value. Consequently, the incentive acquisition section 514 may allow the update section 515 to reference the reward.

The update section 515 uses the additional controller $\pi_j$ to acquire a new policy based on the obtained state, action, and reward. For example, the update section 515 generates the action value table 400 and acquires a new policy based on the action value table 400. The update section 515 acquires a new policy $C_j$ by adding an additional controller $\varphi_j(\pi_j(\varphi_j(s)))$ to the already-acquired policy C. The additional controller $\varphi_j(\pi_j(\varphi_j(s)))$ defines the amount of correction for correcting the current optimal action C(s) within an action range $A_j$.

Consequently, the update section 515 may acquire a more appropriate new policy than the already-acquired latest policy, and make the optimal action closer to an optimal action that is actually locally optimal by using the new policy. As described above, the setting section 511, the state acquisition section 512, the action decision section 513, the incentive acquisition section 514, and the update section 515 may implement the above-described first reinforcement learning.

Subsequently, the update section 515 sets C to $C_j$ and j to j+1. This enables the update section 515 to perform new reinforcement learning, and acquire a new policy and permit a policy update. As described above, the setting section 511, the state acquisition section 512, the action decision section 513, the incentive acquisition section 514, and the update section 515 may implement the above-described second reinforcement learning.

When adding a new additional controller to an already-acquired policy C, the update section 515 may perform a merge process to integrate the new additional controller with an additional controller included in the already-acquired policy C. The update section 515 performs the merge process when, for example, a predetermined time has elapsed. The update section 515 may perform the merge process if no policy change is made by reinforcement learning for a predetermined period of time. The update section 515 may also perform the merge process if the TD error is smaller than a predetermined value for a predetermined period of time. The merge process will be described with reference to FIGS. 8 and 9. As is obvious from the above description, the update section 515 may reduce the processing amount of the action decision section 513.

The output section 516 outputs an action determined by the action decision section 513 to the control target 110. This enables the output section 516 to control the control target 110.

The output section 516 may output the results of processing performed by the various processing sections. An output format is, for example, output to the display, print out to the printer, transmission to an external device through the network I/F 203, or storage into a storage area of the memory 202 or recording medium 205. Consequently, the output section 516 may make the result of processing by each functional section reportable to the user, provide assistance in the management and operation of the reinforcement learning device 100, such as assistance in the update of settings of the reinforcement learning device 100, and improve the user-friendliness of the reinforcement learning device 100.

(Exemplary Operation of Reinforcement Learning Device 100)

An exemplary operation of the reinforcement learning device 100 will now be described with reference to FIG. 6.

Figure 6:
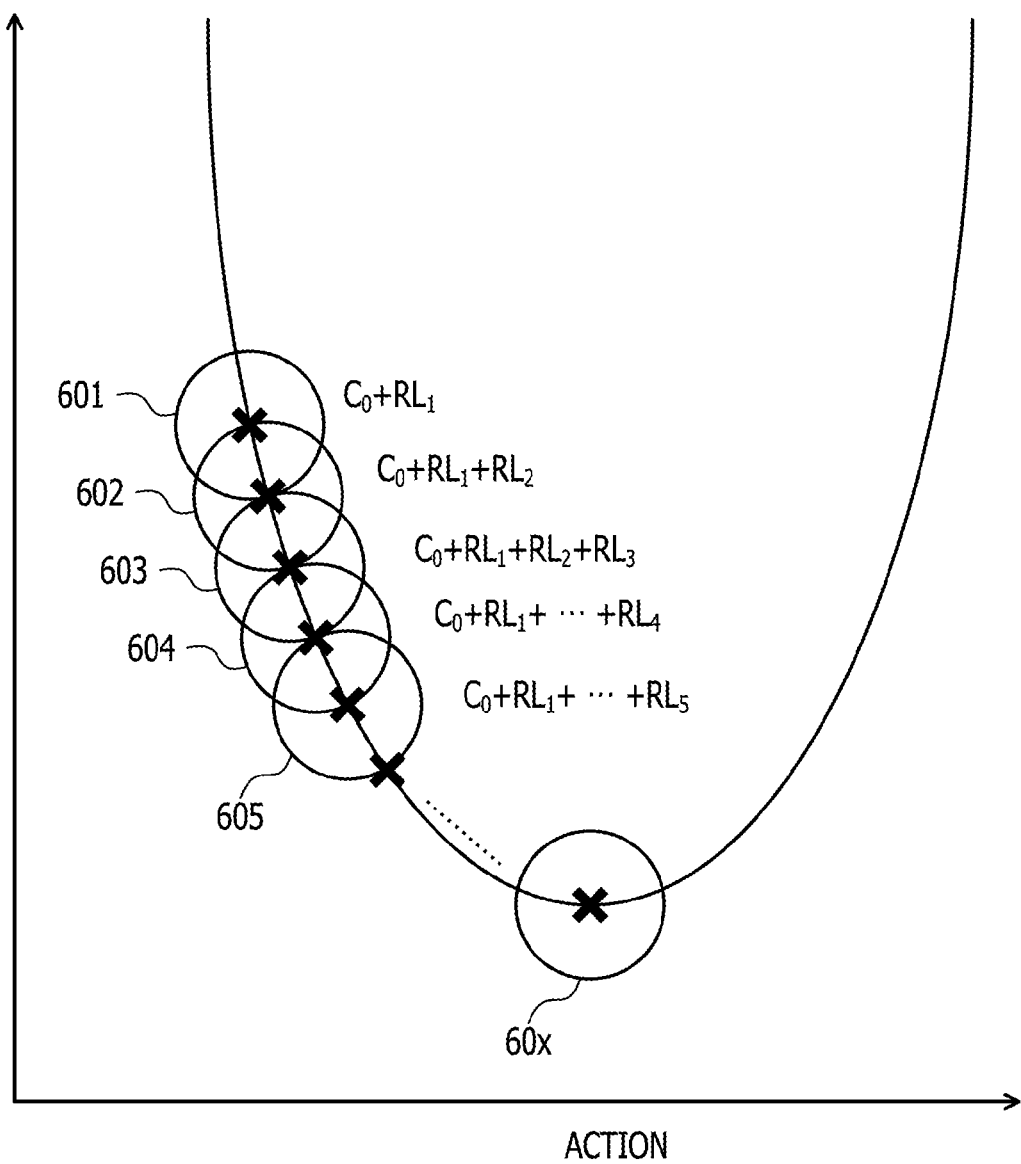
FIG. 6 is a diagram illustrating an exemplary operation of a reinforcement learning device.

FIG. 6 is a diagram illustrating an exemplary operation of the reinforcement learning device 100. The basic controller $C_0$ is, for example, a fixed controller or a PI controller. The reinforcement learning device 100 determines an exploration behavior within an action range in the vicinity of the current optimal action, and determines a controller $RL_j$ (j>0) that defines the correction value based on the exploration behavior. The correction value is, for example, one of three discrete values, for example, −1, 0, and +1.

FIG. 6 is a diagram illustrating a case where reinforcement learning is repeated based on a diurnal outside air temperature data. As illustrated in FIG. 6, the reinforcement learning device 100 determines, in the first reinforcement learning, an exploration behavior within an action range 601 in the vicinity of an optimal action based on $C_0$. Thus, the reinforcement learning device 100 may perform reinforcement learning while avoiding an inappropriate action that adversely affects the control target 110. The reinforcement learning device 100 may acquire a policy $C_0+RL_1$ that permits the determination of a more appropriate optimal action than the current optimal action.

In the second reinforcement learning, the reinforcement learning device 100 determines an exploration behavior within an action range 602 in the vicinity of an optimal action according to an already-acquired policy $C_0+RL_1$. Thus, the reinforcement learning device 100 may perform reinforcement learning while avoiding an inappropriate action that adversely affects the control target 110. When the exploration behavior is to be determined in this instance, the additional controller $RL_1$ is neither explored nor learned, but is fixed. The reinforcement learning device 100 may then acquire the policy $C_0+RL_1+RL_2$ that permits the determination of a more appropriate optimal action than the current optimal action. The reinforcement learning device 100 determines an exploration behavior within an action range in the vicinity of an optimal action according to the already-acquired policy $C_0+RL_1$. Therefore, the reinforcement learning device 100 may decrease the number of exploration behaviors to be tried by a single reinforcement learning and reduce the processing amount and processing time for reinforcement learning.

The reinforcement learning device 100 may determine the exploration behavior within a nearby action range $60x$ by repeating reinforcement learning, and perform reinforcement learning while avoiding an inappropriate action that adversely affects the control target 110. The reinforcement learning device 100 may explore for an optimal action that is locally optimal, and control the control target 110 with high accuracy.

(Changes in Action Range for Determining Exploration Behavior)

Changes in an action range for determining an exploration behavior will now be described in detail with reference to FIGS. 7A to 7C.

Figure 7A:
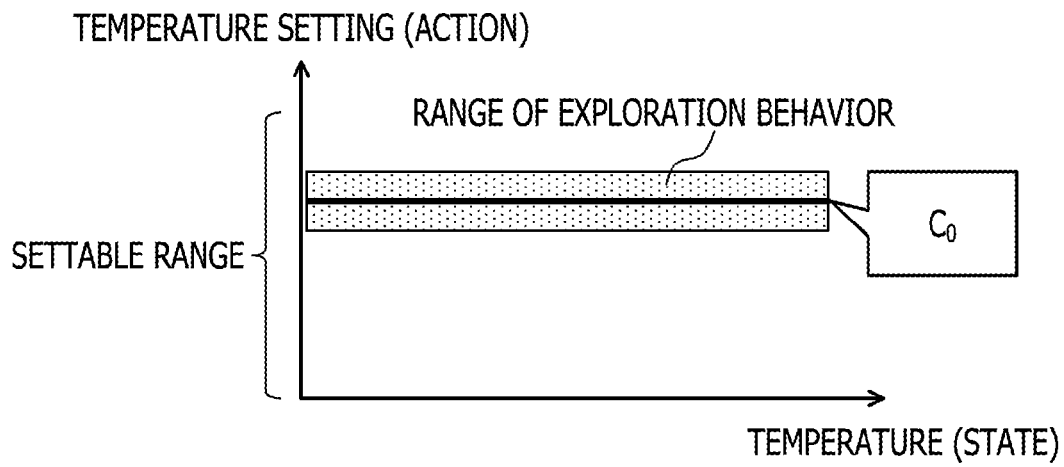
FIGS. 7A to 7C are diagrams illustrating changes in an action range for determining an exploration behavior.
Figure 7B:
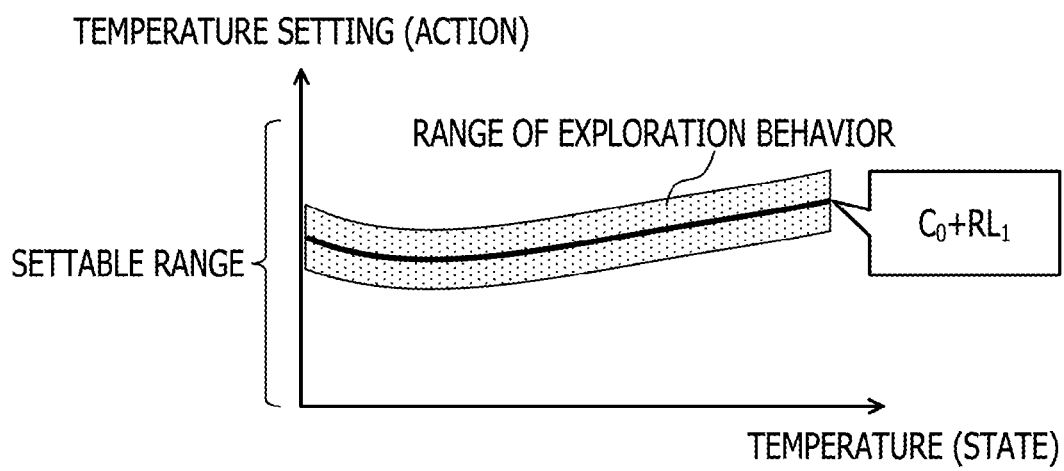
Figure 7C:
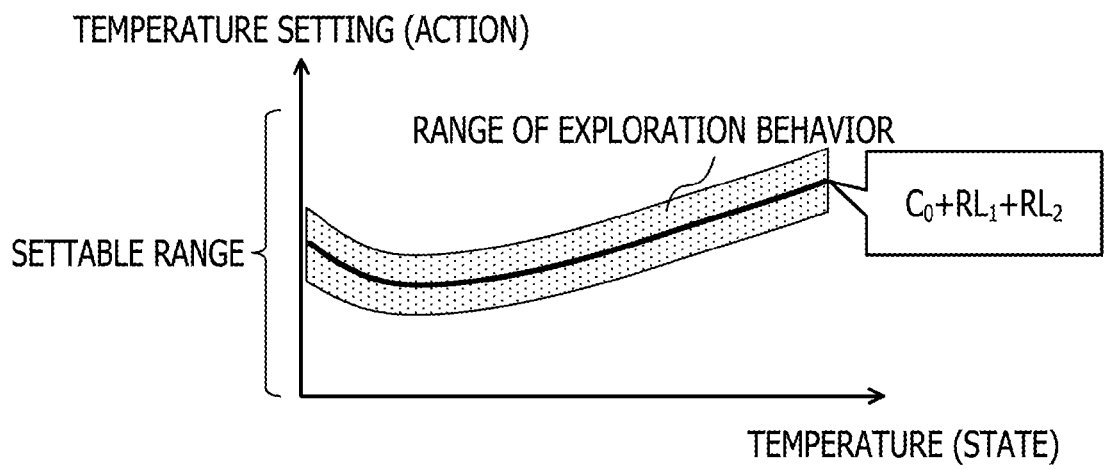

FIGS. 7A to 7C are diagrams illustrating changes in an action range for determining an exploration behavior. FIGS. 7A to 7C each illustrate an exemplary action on the control target depending on the state of the control target. $C_0$ is a basic controller for control a temperature setting to be fixed, and is a fixed controller that provides a linear action based on the state of the control target.

In the first reinforcement learning, for example, the additional controller $RL_1$ is generated as a consequence of repeated exploration behavior determination within an action range in the vicinity of an action determined by $C_0$, as illustrated in FIG. 7A. $C_0$ is then combined with the additional controller $RL_1$ to acquire the policy $C_0+RL_1$. As a result, the already-acquired policy $C_0+RL_1$ is such that a state-based action is curved as depicted in FIG. 7B. Thus, a more appropriate action may be indicated for each state of the control target.

In the second reinforcement learning, for example, the additional controller $RL_2$ is generated as a consequence of repeated exploration behavior determination within an action range in the vicinity of an action determined by the already-acquired policy $C_0+RL_1$, as depicted in FIG. 7B. In this instance, the additional controller $RL_1$ is neither explored nor learned, but is fixed. The policy $C_0+RL_1$ is then combined with the additional controller $RL_2$ to acquire the policy $C_0+RL_1+RL_2$. As a result, the already-acquired policy $C_0+RL_1+RL_2$ is such that a state-based action is curved as depicted in FIG. 7C. Thus, a more appropriate action may be indicated for each state of the control target.

As described above, the reinforcement learning device 100 may repeat reinforcement learning while gradually moving the range for determining an exploration behavior applicable to each state of the control target. The reinforcement learning device 100 may also acquire a policy for making an appropriate action settable for each state of the control target, and control the control target 110 with high accuracy.

(Variation for Decreasing Number of Learnings During j-Th Reinforcement Learning)

A variation for decreasing the number of learnings during the j-th reinforcement learning will now be described. In a case where an action is m-dimensional and the number of variables indicative of the action is m, the reinforcement learning device 100 may determine an exploration behavior by randomly changing fewer than n variables. For example, in the j-th reinforcement learning, the reinforcement learning device 100 may select some air conditioners and determine an exploration behavior.

For example, there is a case where the number of learnings is likely to increase during the j-th reinforcement learning in an environment where the wind speed and temperature setting of twenty air conditioners are to be changed. In such a case, the reinforcement learning device 100 may, for example, determine the exploration behavior by adding a correction amount to an optimal action determined by an already-acquired policy for only three air conditioners randomly selected from a total of twenty air conditioners. In this instance, the reinforcement learning device 100 handles unselected air conditioners, for example, by applying a correction amount of 0. This enables the reinforcement learning device 100 to suppress an increase in the number of variations of the exploration behavior and suppress an increase in the number of learnings during the j-th reinforcement learning.

In the above case, the reinforcement learning device 100 may, for example, randomly divide the twenty air conditioners into three groups and determine the exploration behavior by adding a group-specific correction amount to an optimal action determined by an already-acquired policy. This enables the reinforcement learning device 100 to suppress an increase in the number of variations of the exploration behavior and suppress an increase in the number of learnings during the j-th reinforcement learning.

(Merge Process for Integrating Controllers)

A merge process for integrating controllers will now be described with reference to FIGS. 8 and 9.

FIGS. 8 and 9 are diagrams illustrating a merge process for integrating controllers. As a consequence of repeated reinforcement learning by the reinforcement learning device 100, an increase occurs in the number of additional controllers that are included in an already-acquired policy to define the correction amount for an action. This may increase the amount of processing for optimal action determination for determining an exploration behavior in the j-th reinforcement learning, incur an increased burden, and increase the amount of data. For example, in the j-th reinforcement learning, the already-acquired policy is $C_0+RL_1+RL_2+ \ldots +RL_{j-1}$ so that j controllers are included.

For example, for each reinforcement learning, the reinforcement learning device 100 may generate an action value table 800 and generate an additional controller 810 from the action value table 800, as illustrated in FIG. 8. In this instance, the reinforcement learning device 100 generates different additional controller 810 for each reinforcement learning. This increases the number of additional controllers 810 included in an already-acquired policy.

As a result, when determining an optimal action, the amount of processing by the reinforcement learning device 100 varies depending on the number of additional controllers 810, thereby resulting an increased burden. For example, the reinforcement learning device 100 searches for a state-specific correction amount for each additional controller 810. Under such circumstances, the reinforcement learning device 100 performs a merge process for integrating the controllers in a manner depicted in FIG. 9.

As illustrated in FIG. 9, the reinforcement learning device 100 obtains an integrated additional controller 920 by integrating an additional controller 900 learned in the first reinforcement learning with an additional controller 910 learned in the second reinforcement learning, and then includes the integrated additional controller 920 in a policy. Consequently, when determining an optimal action, the reinforcement learning device 100 may suppress an increase in the burden.

When the reinforcement learning device 100 uses an additional controller $\pi_j$ that uses a common feature amount $\phi$ and action conversion $\varphi$, the reinforcement learning device 100 may express the action value function by using a linear function. In this case, too, the reinforcement learning device 100 may perform the merge process. For example, the reinforcement learning device 100 integrates the action value function $\Sigma w_i s_i$ of the additional controller $RL_1$ with the action value function $\Sigma u_i s_i$ of the additional controller $RL_2$, and defines a policy based on an integrated action value function $\Sigma(w_i+u_i)s_i$ of an additional controller $RL_1+RL_2$.

The reinforcement learning device 100 may also determine an optimal action based on the average of a Gaussian distribution, and use the additional controller $\pi_j$ that determines an exploration behavior based on the dispersion of the Gaussian distribution. In a case where each additional controller $\pi_j$ uses the common feature amount $\phi$ and action conversion $\varphi$ while the average is expressed by a linear function, the merge process may be performed. The reinforcement learning device 100, for example, integrates the average $\Sigma w_i s_i$ of additional controllers $RL_1$ with the average $\Sigma u_i s_i$ of additional controllers $RL_2$, and sets the integrated average of additional controllers $RL_1+RL_2$ to $\Sigma(w_i+u_i)s_i$. The dispersion after the merge may be set, for example, to 0.

The above description deals with a case where the reinforcement learning device 100 performs the merge process to integrate the controllers. However, the present embodiment is not limited to this case. For example, the reinforcement learning device 100 may refrain from performing the merge process for integrating the controllers.

(Results of Repeated Reinforcement Learning)

Figure 10:
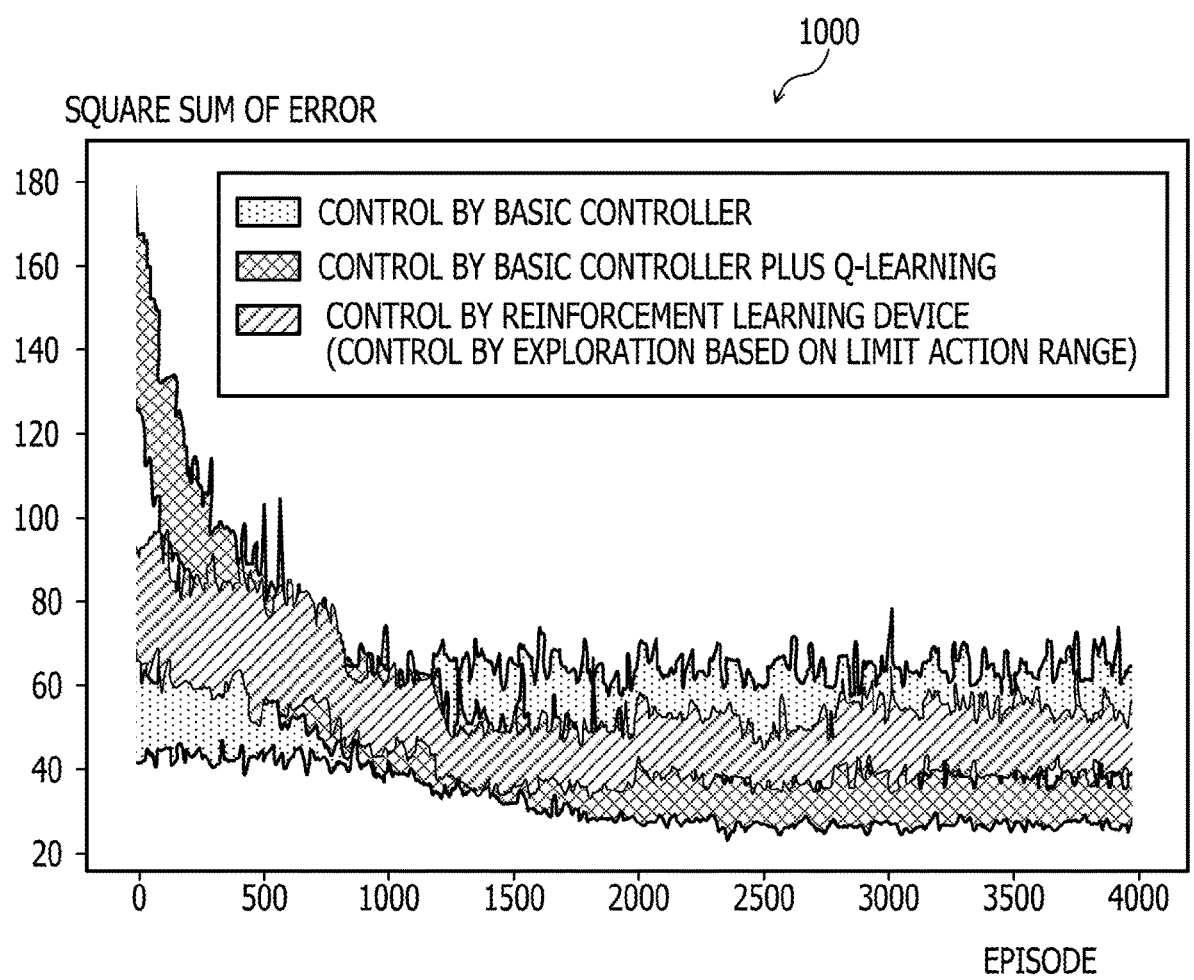
FIG. 10 is a diagram (part 1) illustrating a result of repeated reinforcement learning.
Figure 11:
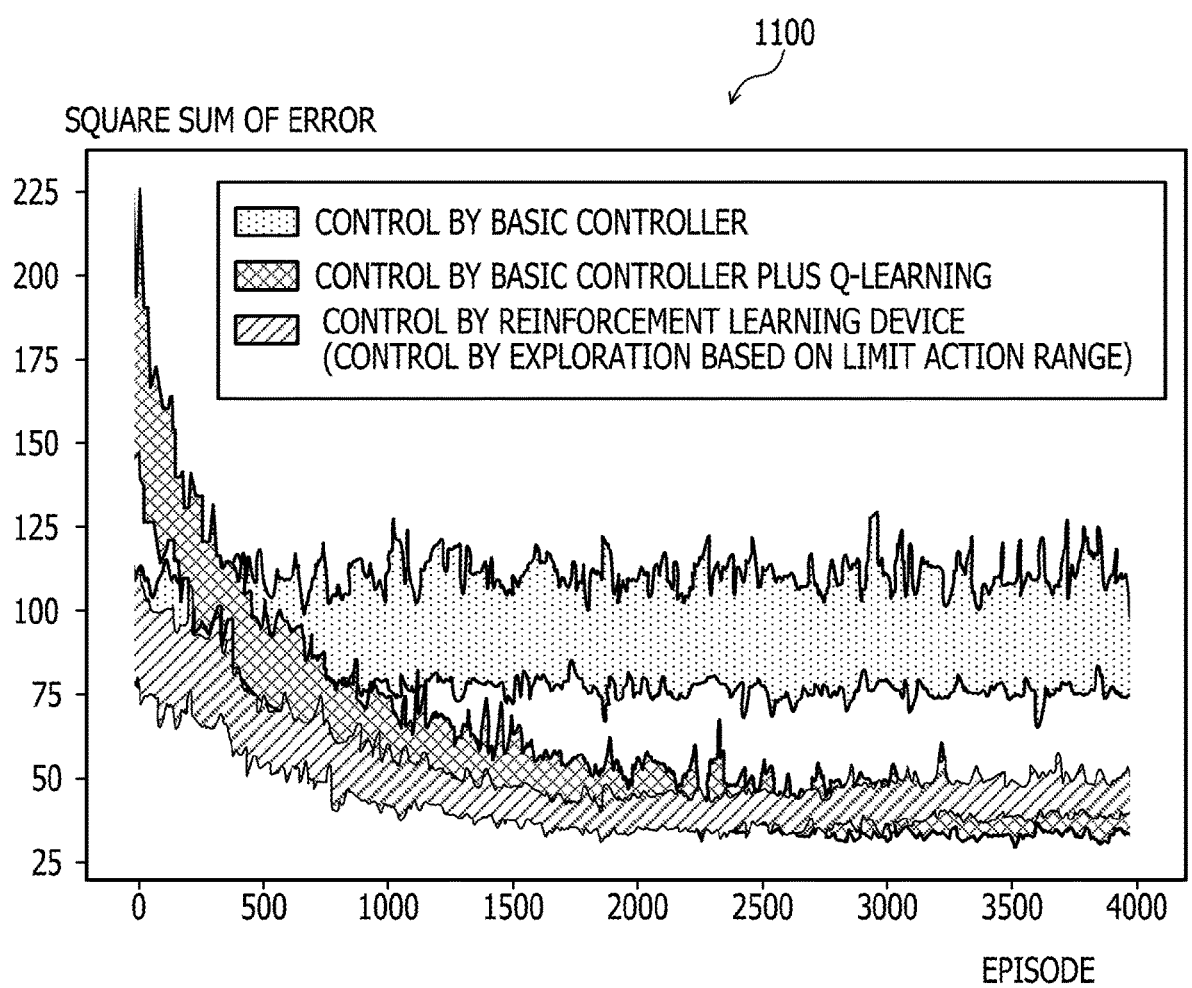
FIG. 11 is a diagram (part 2) illustrating a result of repeated reinforcement learning.

The results of repeated reinforcement learning by the reinforcement learning device 100 will now be described with reference to FIGS. 10 and 11. In the examples of FIGS. 10 and 11, the control target 110 is the room temperature of each of three rooms equipped with an air conditioner. An objective is to minimize the square sum of error between the current room temperature of each room and a target temperature. The sampling time is 1 minute, and there are 1440 steps per day. The number of learning repetitions (the number of episodes) is 1500, and a new additional controller $RL_j$ is added for each set of 300 episodes.

FIGS. 10 and 11 are diagrams illustrating the results of repeated reinforcement learning. FIG. 10 illustrates changes in the square sum of error between a room temperature and a temperature setting when each episode includes 400 steps in a case where the control target 110 is controlled by the basic controller, in a case where the control target 110 is controlled by the basic controller and Q-learning, and in a case where the reinforcement learning device 100 controls the control target 110 by exploration based on the limit action range.

As illustrated in FIG. 10, when the control target 110 is controlled by the basic controller, it is difficult to reduce a square error. Meanwhile, when the control target 110 is controlled by the basic controller and Q-learning, the square error may increase in the first half of learning and may adversely affect the control target 110. However, the reinforcement learning device 100 may reduce the square error while avoiding an action that adversely affects the control target 110 such that the square error increases.

FIG. 11 illustrates changes in the square sum of error between the room temperature and the temperature setting when each episode includes 500 steps in a case where the control target 110 is controlled by the basic controller, in a case where the control target 110 is controlled by the basic controller and Q-learning, and in a case where the reinforcement learning device 100 controls the control target 110 by exploration based on the limit action range.

As illustrated in FIG. 11, when the control target 110 is controlled by the basic controller, it is difficult to reduce the square error. Meanwhile, when the control target 110 is controlled by the basic controller and Q-learning, the square error may increase and adversely affect the control target 110. However, the reinforcement learning device 100 may reduce the square error while avoiding an action that adversely affects the control target 110 such that the square error increases.

(Concrete Examples of Control Target 110)

Concrete examples of the control target 110 will now be described with reference to FIGS. 12 to 14.

Figure 12:
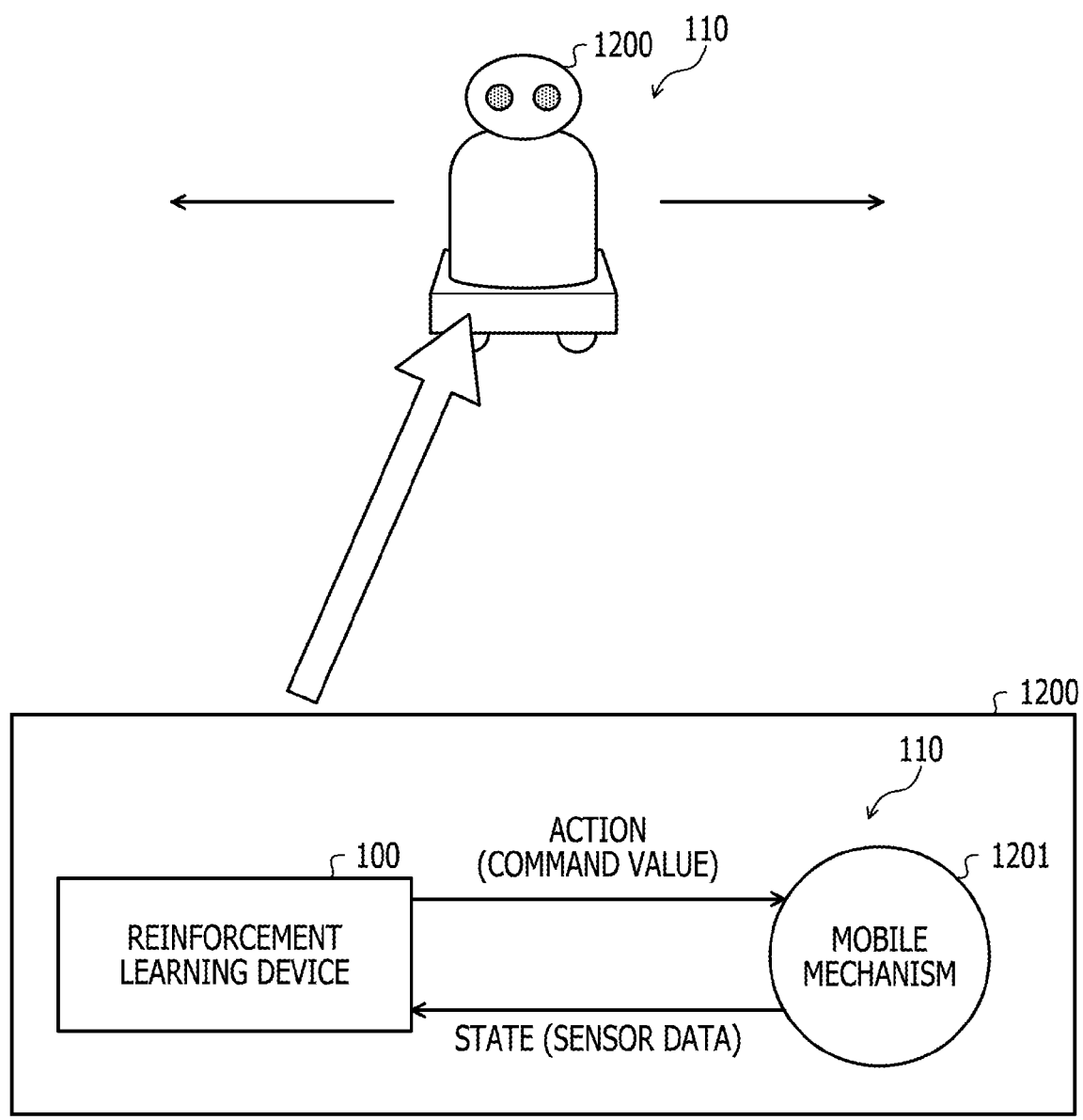
FIG. 12 is a diagram (part 1) illustrating a concrete example of a control target.
Figure 13:
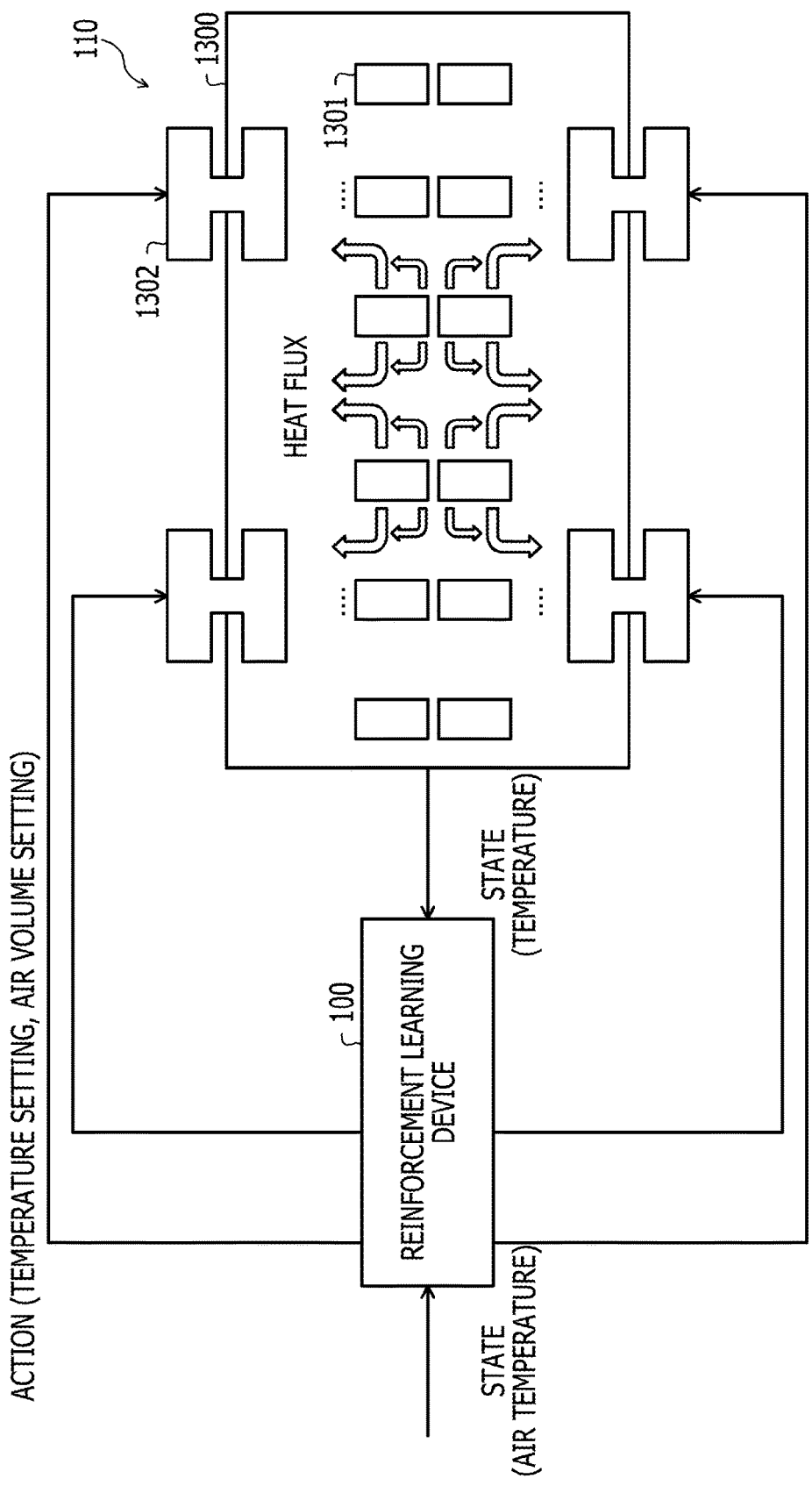
FIG. 13 is a diagram (part 2) illustrating a concrete example of a control target.
Figure 14:
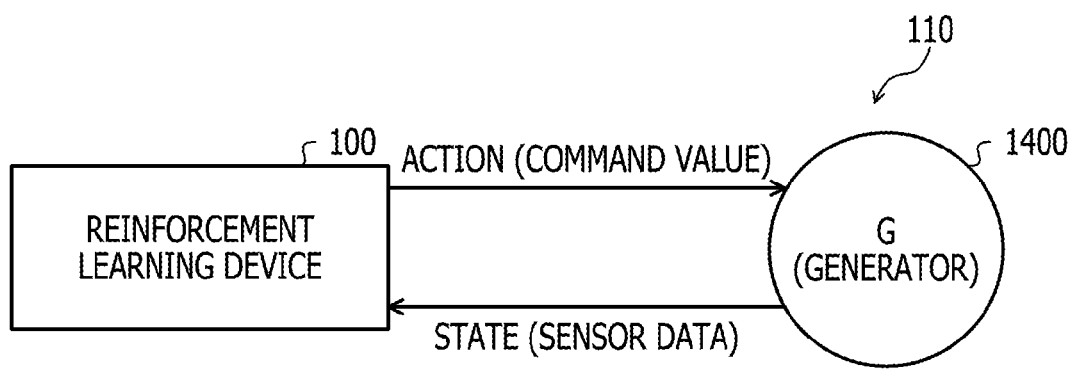
FIG. 14 is a diagram (part 3) illustrating a concrete example of a control target.

FIGS. 12 to 14 are diagrams illustrating concrete examples of the control target 110. In the example of FIG. 12, the control target 110 is an autonomous mobile object 1200 specifically, for example, a mobile mechanism 1201 of the autonomous mobile object 1200. The autonomous mobile object 1200 is, for example, a drone, a helicopter, an autonomous mobile robot, or an automobile. The action is a command value for the mobile mechanism 1201. The action is a command value regarding, for example, a movement direction or a movement distance.

If, for example, the autonomous mobile object 1200 is a helicopter, the action is the speed of a rotor or the inclination of a rotary plane of the rotor. If, for example, the autonomous mobile object 1200 is an automobile, the action is the intensity of acceleration or braking or the orientation of a steering wheel. The state is sensor data from a sensor device installed in the autonomous mobile object 1200, for example, the location of the autonomous mobile object 1200. The reward is a value obtained by multiplying the cost by −1. The cost is, for example, an error between a target operation of the autonomous mobile object 1200 and an actual operation of the autonomous mobile object 1200.

The reinforcement learning device 100 may avoid a situation where a command value for increasing the error between the target operation of the autonomous mobile object 1200 and the actual operation of the autonomous mobile object 1200 is determined as the command value for an exploration behavior. This enables the reinforcement learning device 100 to avoid an inappropriate action that adversely affects the autonomous mobile object 1200.

If, for example, the autonomous mobile object 1200 is a helicopter, the reinforcement learning device 100 may avoid the helicopter from losing its balance, falling down, and becoming damaged. If, for example, the autonomous mobile object 1200 is an autonomous mobile robot, the reinforcement learning device 100 may avoid the autonomous mobile robot from losing its balance, toppling down, bumping against an obstacle, and becoming damaged.

In the example of FIG. 13, the control target 110 is a server room 1300 including, for instance, a server 1301, which is a heat source, and a cooler 1302, such as a computer room air conditioner (CRAC). The action is, for example, a temperature setting or air volume setting for the cooler 1302.

The state is sensor data from a sensor device installed in the server room 1300, for example, a temperature. The state may be data regarding the control target 110 that is available from an object other than the control target 110, for example, an air temperature or weather. The reward is a value obtained by multiplying the cost by −1. The cost is, for example, the square sum of error between a target room temperature and an actual room temperature.

The reinforcement learning device 100 may avoid a situation where an action for raising the temperature of the server room 1300 to a high temperature causing the server in the server room 1300 to malfunction or become defective is determined as the exploration behavior. The reinforcement learning device 100 may also avoid a situation where an action for significantly increasing the 24-hour power consumption of the server room 1300 is determined as the exploration behavior. This enables the reinforcement learning device 100 to avoid an inappropriate action that adversely affects the server room 1300.

In the example of FIG. 14, the control target 110 is a generator 1400. The action is a command value for the generator 1400. The state is sensor data from a sensor device installed in the generator 1400, for example, the amount of power generation by the generator 1400 or the amount of turbine rotation of the generator 1400. The reward is, for example, an incentive. The incentive is, for example, the amount of 5-minute power generation by the generator 1400.

The reinforcement learning device 100 may avoid a situation where a command value for raising the rotation speed of a turbine of the generator 1400 to a high speed for causing the turbine of the generator 1400 to be likely to become defective is determined as the command value for the exploration behavior. The reinforcement learning device 100 may also avoid a situation where a command value for decreasing the amount of 24-hour power generation by the generator 1400 is determined as the command value for the exploration behavior. This enables the reinforcement learning device 100 to avoid an inappropriate action that adversely affects the generator 1400.

The control target 110 may be a simulator in the above-described concrete example. The control target 110 may also be, for example, a chemical plant. The control target 110 may further be, for example, a game. The game is, for example, of such a type that the action is an ordinal scale and is not a nominal scale. The ordinal scale indicates that the magnitude of a value indicative of an action includes a meaning. Meanwhile, the nominal scale relates to a case where, for example, a number assigned to an action by the user for convenience sake is used as a value indicative of the action.

(Reinforcement Learning Process Steps)

Exemplary steps of a reinforcement learning process performed by the reinforcement learning device 100 will now be described with reference to FIG. 15. The reinforcement learning process is implemented, for example, by the CPU 201, a storage area of the memory 202 or recording medium 205, and the network I/F 203, which are depicted in FIG. 2.

Figure 15:
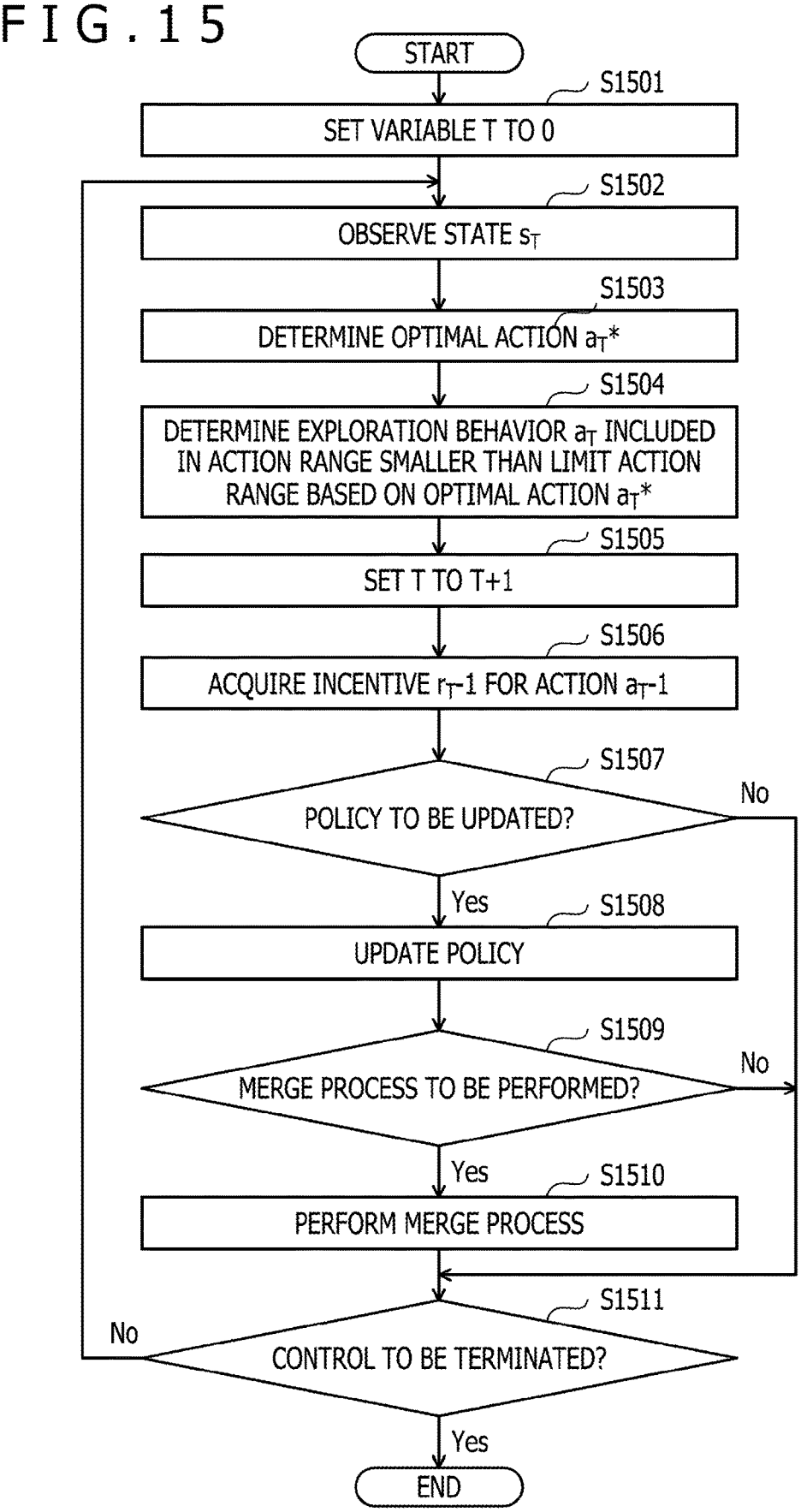
FIG. 15 is a flowchart illustrating exemplary steps of a reinforcement learning process.

FIG. 15 is a flowchart illustrating the exemplary steps of the reinforcement learning process. Referring to FIG. 15, the reinforcement learning device 100 sets a variable T to 0 (step S1501). Next, the reinforcement learning device 100 observes a state $s_T$, and records the observed state $s_T$ by using the history table 300 (step S1502).

The reinforcement learning device 100 then determines an optimal action $a_T*$ in accordance with the already-acquired latest policy (step S1503). Subsequently, the reinforcement learning device 100 determines an exploration behavior $a_T$ included in an action range (which is smaller than the limit action range) around the optimal action $a_T*$, and records the determined exploration behavior $a_T$ by using the history table 300 (step S1504).

Next, the reinforcement learning device 100 sets T to T+1 (step S1505). The reinforcement learning device 100 then obtains an incentive $r_{T-1}$ for an action $a_{T-1}$, and records the obtained incentive $r_{T-1}$ by using the history table 300 (step S1506).

Next, the reinforcement learning device 100 determines whether or not to update the already-acquired latest policy (step S1507). The update is performed, for example, each time a series of processing in steps S1502 to S1506 is executed N times.

If the update is not to be performed (NO at step S1507), the reinforcement learning device 100 proceeds to processing in step S1511. If the update is to be performed (YES at step S1507), the reinforcement learning device 100 proceeds to processing in step S1508.

In step S1508, the reinforcement learning device 100 acquires a new policy to update the already-acquired latest policy (step S1508). Next, the reinforcement learning device 100 determines whether or not to perform the merge process (step S1509).

If the merge process is not to be performed (NO at step S1509), the reinforcement learning device 100 proceeds to processing in step S1511. If the merge process is to be performed (YES at step S1509), the reinforcement learning device 100 proceeds to processing in step S1510.

In step S1510, the reinforcement learning device 100 performs the merge process (step S1510). The reinforcement learning device 100 then proceeds to processing in step S1511.

In step S1511, the reinforcement learning device 100 determines whether or not to terminate control of the control target 110 (step S1511).

If the control is not to be terminated (NO at step S1511), the reinforcement learning device 100 returns to processing in step S1502. If the control is to be terminated (YES at step S1511), the reinforcement learning device 100 terminates the reinforcement learning process. In the above-described manner, the reinforcement learning device 100 may repeatedly acquire a policy for update purposes so that the reinforcement learning device 100 may determine a more appropriate optimal action while avoiding an inappropriate action.

The example of FIG. 15 describes a case where the reinforcement learning device 100 executes the reinforcement learning process in a batch processing mode. However, the present embodiment is not limited to this case. For example, the reinforcement learning device 100 may execute the reinforcement learning process in a sequential processing mode.

As described above, the reinforcement learning device 100 may perform the first reinforcement learning within an action range smaller than the limit action range for the control target 110 by using an action determined by the first policy for which the basic controller is set while the basic controller defines an action on the control target 110 depending on the state of the control target 110. The reinforcement learning device 100 may perform the second reinforcement learning within an action range smaller than the limit action range by using an action determined by a policy acquired by the first reinforcement learning. This enables the reinforcement learning device 100 to avoid performing, as an exploration behavior, an action immoderately deviating from a current optimal action, and avoid an inappropriate action including an adverse effect on the control target 110. The reinforcement learning device 100 may also acquire a policy and perform a policy update so that the reinforcement learning device 100 may accurately determine a more appropriate optimal action while avoiding an inappropriate action. As a result, each time the already-acquired latest policy is updated, the reinforcement learning device 100 may make an optimal action determined by the policy close to an optimal action that is actually locally optimal, and control the control target 110 in an appropriate manner.

The reinforcement learning device 100 may use an action determined by a policy acquired by the last-performed second reinforcement learning in order to perform a new second reinforcement learning within an action range smaller than the limit action range. This enables the reinforcement learning device 100 to repeatedly acquire a policy and perform a policy update so that the reinforcement learning device 100 may accurately determine a more appropriate optimal action while avoiding an inappropriate action. As a result, each time the already-acquired latest policy is updated, the reinforcement learning device 100 may make an optimal action determined by the policy close to an optimal action that is actually locally optimal. As a consequence of repetition, the reinforcement learning device 100 may acquire a policy for determining an optimal action that is actually locally optimal. This permits the reinforcement learning device 100 to perform a local optimal action and control the control target 110 in an appropriate manner.

By performing the first reinforcement learning, the reinforcement learning device 100 may acquire a policy including the basic controller and an additional controller. The additional controller defines the amount of correction within an action range (which is smaller than the limit action range) around an action determined by the first policy for which the basic controller is set. By performing the second reinforcement learning, the reinforcement learning device 100 may acquire a policy including the last-acquired policy and an additional controller that defines the amount of correction within an action range (which is smaller than the limit action range) around an action determined by the last-acquired policy.

By performing the second reinforcement learning, the reinforcement learning device 100 may acquire a policy that is obtained by integrating an additional controller included in the last-acquired policy with an additional controller defining the amount of correction within an action range (which is smaller than the limit action range) around an action determined by the last-acquired policy. This enables the reinforcement learning device 100 to decrease the number of additional controllers included in the acquired policy and reduce the amount of processing in determining an action in accordance with the acquired policy.

The reinforcement learning method described in the present embodiment may be implemented by executing a prepared program on a computer such as a personal computer or a workstation. A reinforcement learning program described in the present embodiment is recorded on a computer-readable recording medium such as a hard disk, a flexible disk, a compact disk (CD)-ROM, magnetooptical disk (MO), or digital versatile disk (DVD), and is executed when read from the recording medium by the computer. The reinforcement learning program described in the present embodiment may be distributed over a network such as the Internet.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium having stored therein a program that causes a computer to execute a process, the process comprising:
    determining an optimal first action on a control device having a sensor sensing an environment of the device using a basic controller that defines an action on the control target depending on a first state of the control target;
    performing a first reinforcement learning exploring device behavior around the first optimal action and within a first action range to acquire a first policy for determining a second action on the control target depending on a following state of the control target based on changing data received from the sensor, wherein the first action range is smaller than a limit action range for the control device;
    determining the second action on the device by using the first policy; and
    updating the first policy to a second policy by performing a second reinforcement learning within a second action range around the second action, wherein the second action range is smaller than the limit action range; and
    determining an optimal second action based on the second policy in which the determined second action is based device behavior in response to a first optimal action, the second optimal action resulting in improved performance of the control device.

2. The non-transitory computer-readable recording medium according to claim 1, the process further comprising:
    repeatedly executing a process of determining a next action on the control target by using a policy updated based on last-performed second reinforcement learning and updating the updated policy again by performing the second reinforcement learning again within a next action range around the determined next action, wherein the next action range is smaller than the limit action range.

3. The non-transitory computer-readable recording medium according to claim 1, wherein
    The first policy includes the basic controller and a first controller that defines an amount of correction for correcting an action on the control target within the first action range, and
    the second policy is obtained by updating the first policy so as to further include a second controller that defines an amount of correction for correcting an action on the control target within the second action range.

4. The non-transitory computer-readable recording medium according to claim 1, wherein
    the first policy includes the basic controller and a first controller that defines an amount of correction for correcting an action on the control target within the first action range, and
    the second policy is obtained by updating the first policy so as to include a third controller instead of the first controller, wherein the third controller is obtained by integrating the first controller with a second controller that defines an amount of correction for correcting an action on the control target within the second action range.

5. A reinforcement learning method comprising:
    determining, by a computer, an optimal first action on a control device having a sensor sensing an environment of the device using a basic controller that defines an action on the control target depending on a first state of the control target;
    performing a first reinforcement learning exploring device behavior around the first optimal action and within a first action range to acquire a first policy for determining a second action on the control target depending on a second state of the control target based on changing data received from the sensor, wherein the first action range is smaller than a limit action range for the control device;
    determining the second action on the device by using the first policy; and
    updating the first policy to a second policy by performing a second reinforcement learning within a second action range around the second action, wherein the second action range is smaller than the limit action range; and
    determining an optimal second action based on the second policy in which the determined second action is based device behavior in response to a first optimal action, the second optimal action resulting in improved performance of the control device.

6. A reinforcement learning device comprising:
    a memory; and
    a processor coupled to the memory and the processor configured to:
    determine an optimal first action on a control device having a sensor sensing an environment of the device using a basic controller that defines an action on the control target depending on a first state of the control target;
    perform a first reinforcement learning exploring device behavior around the first optimal action and within a first action range to acquire a first policy for determining a second action on the control target depending on a second state of the control target based on changing data received from the sensor, wherein the first action range is smaller than a limit action range for the control device;
    determine the second action on the device by using the first policy; and
    update the first policy to a second policy by performing a second reinforcement learning within a second action range around the second action, wherein the second action range is smaller than the limit action range; and
    determine an optimal second action based on the second policy in which the determined second action is based device behavior in response to a first optimal action, the second optimal action resulting in improved performance of the control device.

\* \* \* \* \*